(12) United States Patent
O'Hare et al.

(10) Patent No.: US 6,553,471 B1
(45) Date of Patent: Apr. 22, 2003

(54) CONTROLLING ACCESS TO A STORAGE DEVICE BY CONTROLLING COMMUNICATION PORTS THERETO

(75) Inventors: Jeremy O'Hare, Milford, MA (US); Brian Garrett, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/533,009

(22) Filed: Mar. 22, 2000

Related U.S. Application Data

(60) Provisional application No. 60/180,632, filed on Feb. 7, 2000.

(51) Int. Cl.[7] .................................................. G06F 13/00
(52) U.S. Cl. ........................................ 711/163; 711/154
(58) Field of Search ................................. 711/154, 163

(56) References Cited

U.S. PATENT DOCUMENTS

| | | | |
|---|---|---|---|
| 5,206,939 A | | 4/1993 | Yanai et al. .................... 711/4 |
| 5,664,098 A | * | 9/1997 | Bianchi et al. ................ 703/27 |
| 5,675,782 A | * | 10/1997 | Montague et al. ............ 707/10 |
| 5,754,844 A | * | 5/1998 | Fuller ......................... 707/101 |
| 5,761,669 A | * | 6/1998 | Montague et al. ...... 707/103 R |
| 5,778,394 A | | 7/1998 | Galtzur et al. .............. 707/205 |
| 5,835,764 A | * | 11/1998 | Platt et al. ................... 709/101 |
| 5,845,147 A | | 12/1998 | Vishlitzky et al. ............. 715/5 |
| 5,857,208 A | | 1/1999 | Ofek .......................... 707/204 |
| 6,298,390 B1 | * | 10/2001 | Matena et al. ............... 709/315 |
| 6,412,070 B1 | * | 6/2002 | Van Dyke et al. ............ 707/10 |

OTHER PUBLICATIONS

Charles P. Pfleeger, 'Security in Computing', second edition, Prentice Hall PTR, 1997, pp. 228–265.*

* cited by examiner

*Primary Examiner*—Reba I. Elmore
(74) *Attorney, Agent, or Firm*—Choate, Hall & Stewart

(57) ABSTRACT

Controlling access to a storage device includes defining a plurality of groups that access the storage device, defining a plurality of pools of devices of the storage device, and, for at least one of the groups, determining access rights with respect to at least one of the pools. The pools of devices may include communication ports of the storage device. The access rights may indicate whether system calls are allowed on the communication ports. In some embodiments, restricting access to a storage device includes coupling each of a plurality of host systems to the storage device by one of a plurality of ports provided for the storage device and selectively determining, for each of the ports, whether system calls are allowed, where, for the ports in which system calls are not allowed, a system call by the host systems coupled thereto causes the storage device to indicate that the system call was not performed.

24 Claims, 3 Drawing Sheets

CONTROLLING ACCESS TO A STORAGE DEVICE BY CONTROLLING COMMUNICATION PORTS THERETO

CROSS REFERENCE TO RELATED APPLICATIONS

This application is based on U.S. provisional patent application No. 60/180,632 filed on Feb. 7, 2000 (pending), which is incorporated herein by reference.

BACKGROUND OF THE INVENTION

1. Field of the Invention

This application relates to the field of computer data storage and more particularly to the field of configuring controlling system call access to data storage devices.

2. Description of Related Art

Host systems may store and retrieve data using a data storage device containing a plurality of host interface units (ports) that communicate with and store and retrieve data on internal storage facilities provided within the data storage device. Such data storage devices are provided, for example, by EMC Corporation of Hopkinton, Massachusetts and disclosed in U.S. Pat. No. 5,206,939 to Yanai et al, U.S. Pat. No. 5,778,394 to Galtzur et al, U.S. Pat. No. 5,845,147 to Vishlitzky et al, and U.S. Pat. No. 5,857,208 to Ofek.

The host systems may be assigned access to specific portions of the internal storage facilities, where that access may include reading and writing data and "system calls" that cause the data storage device to execute administrative-like operations (e.g., automatic mirroring, copying, back up). The system calls may not directly read and write data. However, even so, system calls could cause one of the host systems to indirectly access data allocated to another one of the host systems. In addition, remote system calls may be issued to a storage device through a remote storage device (e.g., in a disaster recovery situation) or through a fabric port.

The use of system calls to provide one host system such indirect access to memory allocated to another host system is may not be problematic if all of the host systems and the storage device are controlled by a single entity (i.e., are all owned and operated by a single company) that is capable of coordinating access among different groups within the entity. However, in instances where not all of the host systems are controlled by a single entity (e.g., in instances where a plurality of different smaller companies share use of a single data storage device) and in instances where different groups of the same entity access the host systems in an uncoordinated manner, it may be undesirable to allow such indirect access of internal storage facilities using system calls, especially in instances where the data storage device contains sensitive data of one or more of the entities and/or groups within a single entity. Furthermore, in configurations where a storage device is coupled to additional storage devices to provide backup services therefor, it may be undesirable to allow unintended access to data via system calls.

SUMMARY OF THE INVENTION

According to the present invention, controlling a storage device includes defining at least one group that access the storage device, defining at least one pool of devices of the storage device, defining a plurality of access types, and, for the at least one group, determining access rights with respect to the at least one pool for at least one of the access types. The access types may include system calls. The at least one group and the at least one pool may include logical or physical units. The at least one pool may include communication ports of the storage device. The access rights may indicate whether system calls are allowed on the communication ports.

According further to the present invention, restricting access to a storage device includes coupling each of a plurality of host systems to the storage device by one of a plurality of ports provided for the storage device and selectively determining, for each of the ports, whether system calls are allowed, where, for the ports in which system calls are not allowed, a system call by the host systems coupled thereto causes the storage device to indicate that the system call was not performed. Restricting access may also include providing a mechanism that controls whether the ports can accept system calls. Providing a mechanism may include providing an external control device coupled to the storage device. The external control device may act like a dumb terminal sending characters to and receiving characters from the storage device.

Restricting access may also include providing an override mechanism that allows system calls on ports that otherwise do not allow system calls. The override mechanism may also block system calls on ports that otherwise allow system calls. Restricting access may also include resetting the override mechanism after a predetermined amount of time has passed since the mechanism had been set. The predetermined amount of time may be thirty minutes. Restricting access may also include providing an external control device that facilitates setting of the override mechanism. Providing the external control device may include providing a dumb terminal that sends characters to and receives characters from the storage device.

According further to the present invention, a port of a storage device includes means for receiving data provided to the storage device, means for sending data from the storage device, and means for inhibiting system calls provided to the port, where the system calls include requests for administrative operations for the storage device that do not send or receive data.

According further to the present invention, computer software for controlling a port on a storage device includes means for communicating with the storage device and control means, coupled to the means for communicating, for providing commands to the storage device that cause the port to not accept system commands provided thereto, wherein the system commands include requests for administrative operations by the storage device.

According further to the present invention, an apparatus for controlling a port on a storage device includes a port driver coupled to the port to handle data communication with the storage device and a security module, coupled to the port driver to control data communicated by the port driver based on a security configuration data element and an override indicator data element. The apparatus may also include a security configuration control module, coupled to the security configuration data element to control a state thereof. The apparatus may also include a disk configuration data element, coupled to the security configuration control module, where the security configuration control module controls the state of the security configuration data element according to a state of the disk configuration data element. The apparatus may also include an external interface module, coupled to the disk configuration data element to control the state thereof, where the external interface module receives command data provided to the storage device. The external module may be coupled to the override indicator data element to control a state thereof. The apparatus may also include a counter module, coupled to the override indicator data element to control the state thereof according to an amount of time that has passed.

According further to the present invention, determining whether to perform a system command received at a port of a storage device includes determining if an open override is set, determining if port control data exists, determining if port control data indicates that system calls are allowed, and performing a system call in response to at least one of: port control data indicating that system calls are allowed, an open override being set, and port control data not existing. Determining whether to perform a system command may also include determining if a close override is set and rejecting a system call in response to at least one of: a close override being set and port control data indicating that system calls are not allowed.

DETAILED DESCRIPTION OF THE PREFERRED EMBODIMENT(S)

Figure 1:
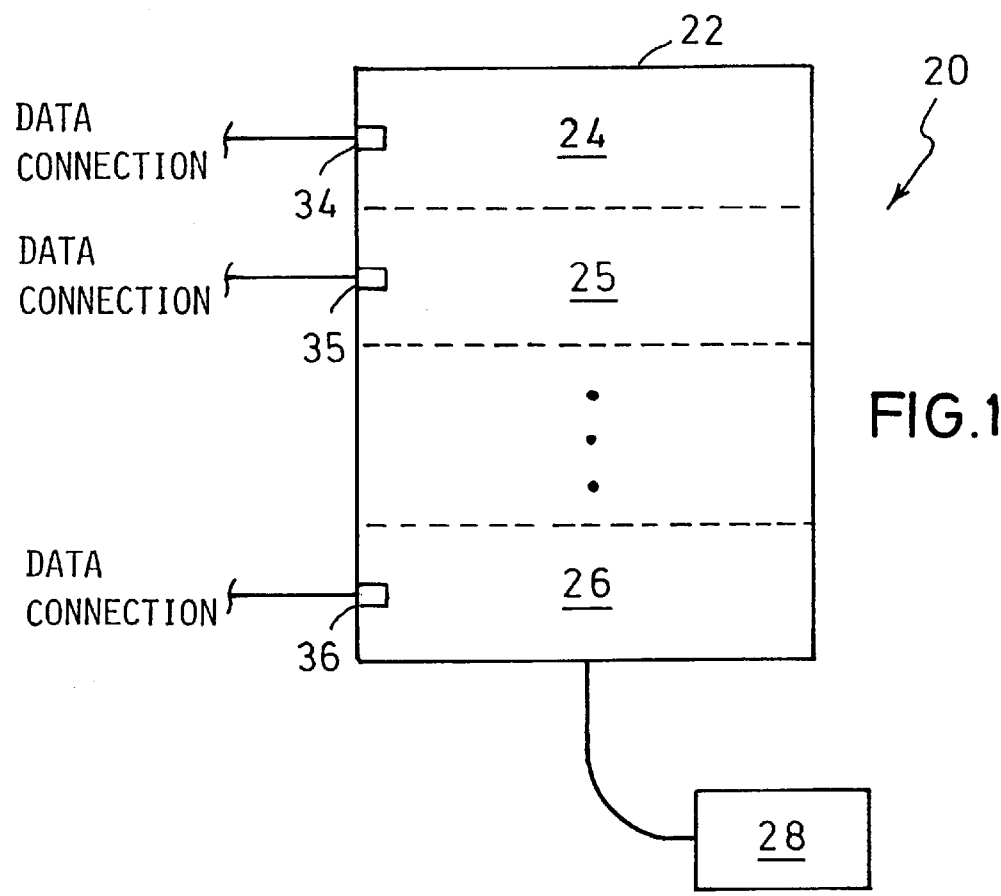
FIG. 1 is a schematic diagram that illustrates a storage device configured according to the present invention.

Referring to FIG. 1, a system 20 includes a data storage device 22 capable of storing data for a plurality of host systems coupled thereto (not shown), via the data connections. The host systems may include one or more host processors or other data storage devices. The data storage device 22 may be implemented using a Symmetrix storage device manufactured by EMC Corporation of Hopkinton, Massachusetts or by other types of data storage devices capable of providing the functionality described herein.

The data storage device 22 is shown as being partitioned into a plurality of sections 24–26, each of which represents a portion of the resources of the data storage device 22 that are accessed by one of the host systems coupled thereto (e.g., a host processor or another data storage device). These resources may include, for example, portions of the internal memory of the data storage device 22.

An external control device 28 may be coupled in a conventional manner to the data storage device 22 to control operations thereof. The external control device 28 may be implemented using the Symmetrix Symm Win functionality, which is provided by EMC Corporation of Hopkinton, MA as software for operation on a conventional computer workstation and other appropriate software and hardware to facilitate connection and communication between the workstation and the data storage device 22. In some embodiments, the external control device 28 acts like a dumb terminal that communicates with the data storage device 22 using conventional software provided therewith for that purpose. Operations performed by the external control device 28 are discussed in more detail hereinafter.

The data storage device 22 also includes a plurality of external ports 34–36 which provide communication for the host systems coupled to the storage device 22. The ports 34–36 allow the host systems to store data to and retrieve data from the data storage device 22. Each of the ports 34–36 handles communication for one of the host systems coupled to the data storage device 22.

The host systems coupled to the data storage device 22 may control the data storage device 22 and may control access and use of the sections 24–26 of the data storage device 22 by using administrative-like system calls that may be provided through the ports 34–36. Such system calls may, in effect, control configuration and operation of the data storage device 22. In some embodiments, system calls are differentiated from calls that simply read and write data from and to the ports 34–36 even though, as discussed above, some system calls may indirectly cause data stored in the data storage device 22 to be affected.

In instances where the data storage device 22 and all of the host systems coupled thereto are controlled by a single entity, then having the host systems perform system calls that may affect access by other ones of the host systems is straight-forward. However, in instances where the host systems may be controlled by different entities, or different groups within the same entity, then it may become problematic to allow one host system to make a system call that could affect one of the sections 24–26 of the data storage device 22 allotted to another host system controlled by a different entity. In other words, system calls made by host systems controlled by different entities could conflict.

In order to address such situations, some or all of the ports 34–36 of the data storage device 22 may be configured not to accept system calls from the host systems (or any other device for that matter) coupled thereto. Since the system calls may modify the configuration and access scheme of the data storage device 22, then restricting system calls at some or all of the ports 34–36 inhibits the host systems coupled thereto from accessing the resources allocated to other host systems. Thus, for example, if the section 24 represents the storage memory allocated to the host system coupled to the port 34 and the section 25 represents storage memory allocated to the host system coupled to the port 35, then inhibiting system calls at the ports 34, 35 prevents, for example, the host system coupled to the port 34 from improperly accessing the section 25 of the storage memory allocated to the host system coupled to the port 35. As discussed in more detail below, the configuration and allocation functions performed by system calls may be performed only by the external control device 28 or by the external control device and only a subset of the host systems coupled to the ports 34–36.

Figure 2:
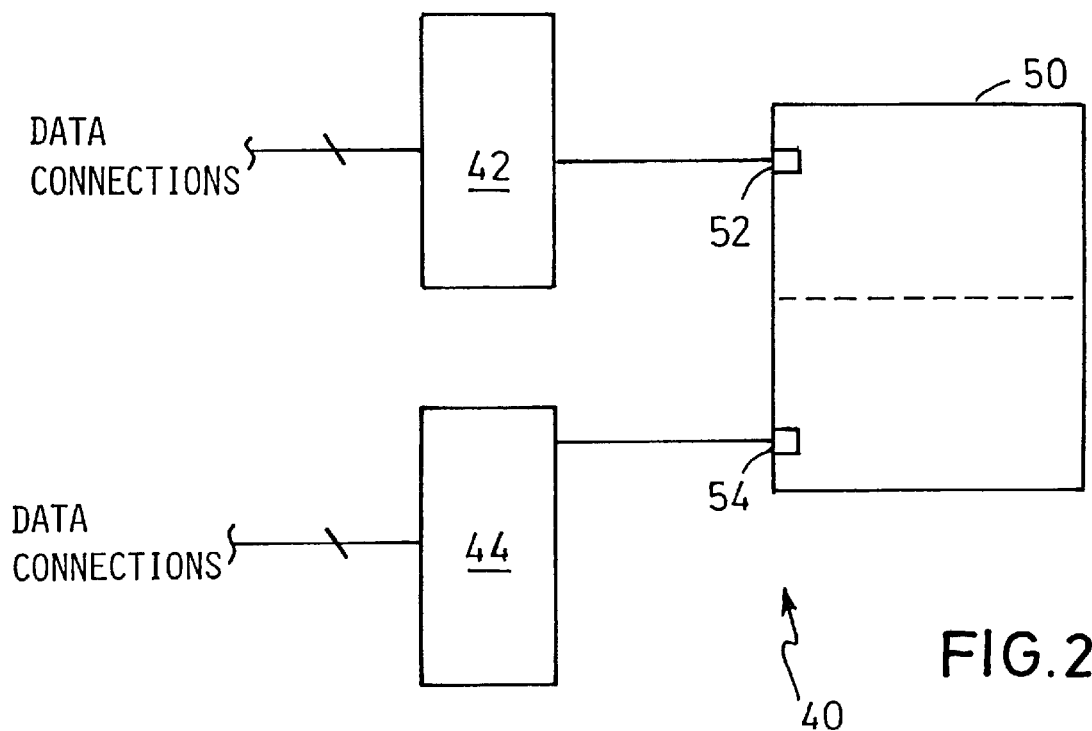
FIG. 2 is a schematic diagram that illustrates a plurality of storage devices configured according to the present invention.

Referring to FIG. 2, a system 40 illustrates a configuration where other data storage devices are coupled to another storage device. The system 40 includes a first data storage device 42, a second data storage device 44, and a third data storage device 50. The first data storage device 42 is coupled to third data storage device 50 via a port 52. The second data storage device 44 is coupled to the third data storage device 50 via a port 54.

The system 40 shown in FIG. 2 could represent, for example, a third party data backup scheme where a first entity controls the first data storage device 42, a second, unrelated, entity controls the second data storage device 44 and where both the first and second entities obtain data backup services from a third entity that controls the data storage device 50. In some instances, the data storage device 50 is provided in a location that is remote from the locations of the first and second data storage devices 42, 44. In such a configuration, it may be useful to inhibit system calls at the ports 52, 54 to prevent the data storage device 42 coupled to the port 52 from accessing portions of the data storage device 50 that are allocated for us e by the data storage device 44 coupled to the port 54. Similarly, it may desirable to inhibit system calls at the port 54 to prevent the data storage device 44 from accessing portions of the data storage device 50 allocated for use by the data storage device 42. A mechanism for inhibiting such access is discussed in more detail hereinafter.

Figure 3:
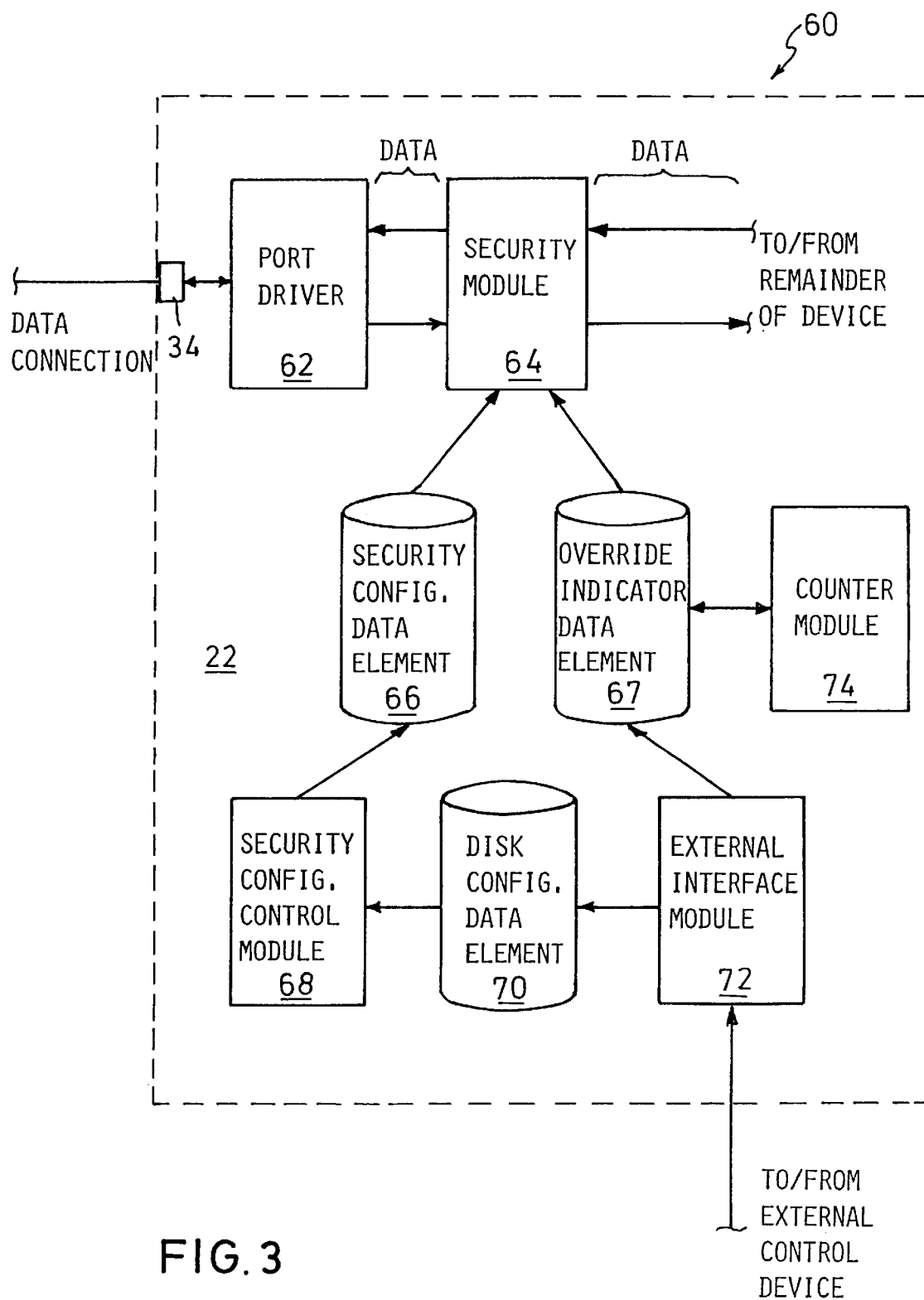
FIG. 3 is a data flow diagram that illustrates operation of an embodiment of the present invention.

Referring to FIG. 3, a data flow diagram 60 illustrates operation of software that handles communication and system call enabling and disabling at the ports 34–36 of the data storage device 22. A port driver 62 receives data provided to the data storage device 22 via the port 34 and provides data from the data storage device 22 through the port 34 to a host system coupled thereto (not shown). The port 34 provides communication between the host system and the data storage device 22. The diagram 60 only shows a single port 34 and a corresponding single port driver 62 in order to facilitate the discussion that follows. However, it may be appreciated by one of ordinary skill in the art that the functionality described herein is extendable to any or all of the ports 34–36 of the data storage device 22.

The port driver 62 is coupled to a security module 64 so that all data going in to and out of the data storage device 22 via the port 34 is controlled by the security module 64. Thus, as shown in FIG. 3, the security module 64 includes connections to and from the remainder of the data storage device 22 to provide normal functionality thereof. However, as discussed in more detail below, the security module 64 may inhibit the transfer of data and/or system calls from/to the data storage device 22 under certain circumstances. Operation of the security module 64 is discussed in more detail hereinafter.

The security module 64 is provided with security configuration information from a security configuration data element 66. As discussed in more detail below, the security configuration data element 66 controls operation of the security module 64 and thus controls the data that may be provided to and from the port driver 62. The security module 64 is also provided with information from an override indicator data element 67 that also controls operation of the security module 64. A security configuration control module 68 controls the contents of the security configuration data element 66 to indicate the type of access permitted at the port 34 through the port driver 62. The security configuration control module 68 can provide data indicating whether system calls are accepted by the port driver 62 and subsequently handled by the remainder of the data storage device 22.

In some embodiments, the override indicator data element 67 contains one variable for each of the ports 34–36, where each of the variables take on one of three values indicating one of: no override, open override, and close override. The open override value indicates that, irrespective of the settings in the security configuration data element 66, the corresponding one of the ports 34–36 will accept system calls. Similarly, the close override value indicates that, irrespective of the settings in the security configuration data element 66, the corresponding one of the ports 34–36 will not accept system calls.

The security configuration control module 68 obtains data from a disk configuration data element 70 that is stored in an internal non-volatile area of the data storage device 22 (e.g., provided on a portion of disk space used for general control of the data storage device 22). The disk configuration data element 70 includes information regarding the type of access that is permitted to each of the ports 34–36 of the data storage device 22.

An external interface module 72 includes conventional software for communicating with the external control device 28. The external interface module 72 provides a mechanism for modifying the disk configuration data element 70 to indicate the type of access provided at each of the ports 34–36 of the data storage device 22. Note also that, as discussed in more detail below, the external interface module 72 may provide a mechanism for overriding the data of the security configuration data element 66 by writing to the override indicator data element 67. The override may be permanent or may be set to a predetermined amount of time, such as thirty minutes. In the case of the override being set to a predetermined amount of time, a counter module 74 interacts with the override indicator data element 67 to reset the override after the amount of time. The mechanism for this is discussed in more detail below.

Figure 4:
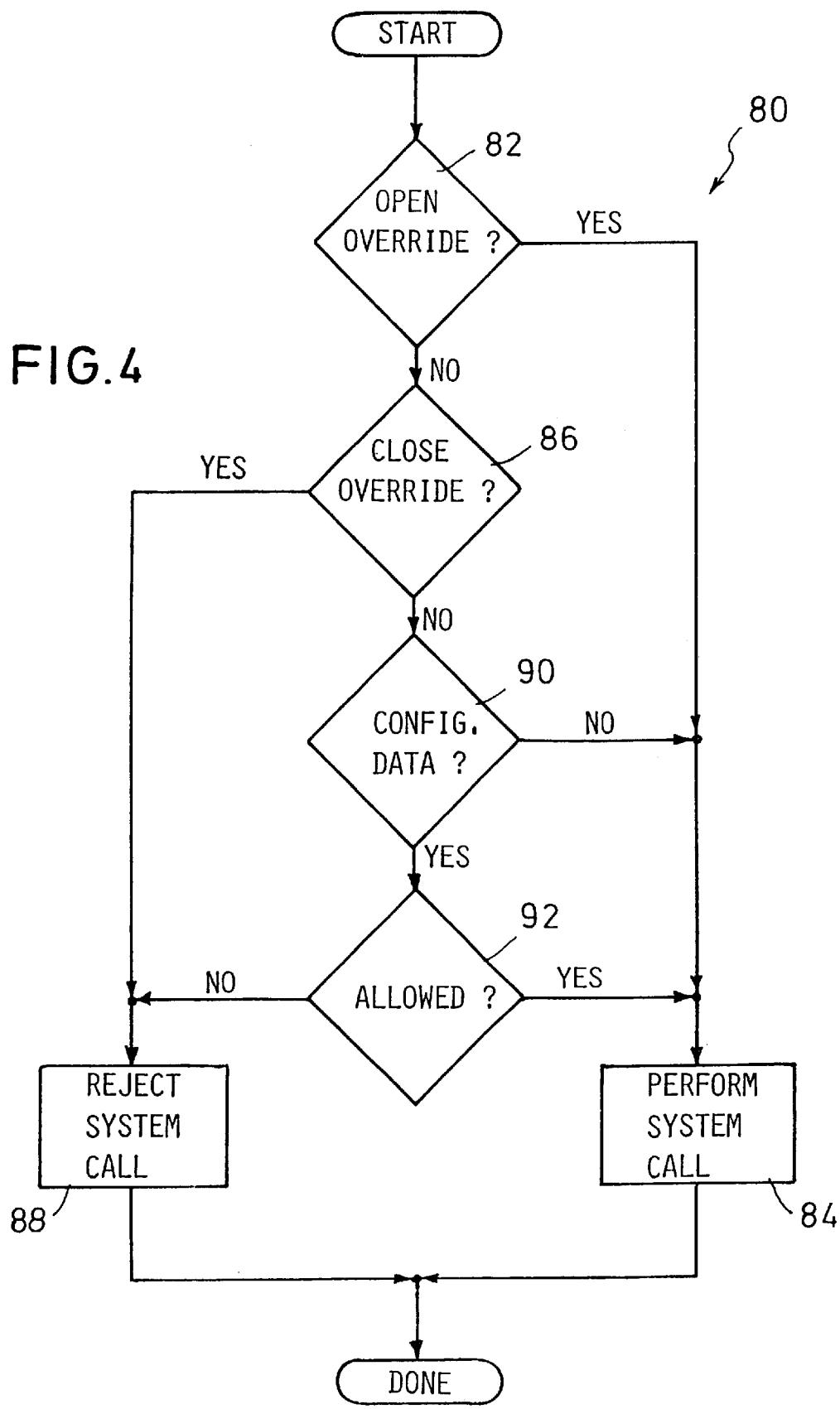
FIG. 4 is a flow chart that illustrates steps performed according to an embodiment of the present invention.

Referring to FIG. 4, a flow chart 80 illustrates operation of the system described herein. At a first test step 82, it is determined whether the open override has been set. An open override occurs when a user at the external control device 28, having appropriate access security, indicates that an override of the default settings for the security of one or more of the ports 34–36 is desired. If so, the user uses the external interface module 72 to access the override indicator data element 67 accordingly. In one embodiment, the open override may be set by a user with system control security and may only exist for a predetermined amount of time after being set. The time limit may be implemented by the counter module 74 of FIG. 3 in a conventional manner which counts for the predetermined amount of time (e.g., thirty minutes) after the open override is set and provides an appropriate reset to indicate no override after the predetermined amount of time.

If it is determined that the test step 82 that the open override has been set, then control passes from the test step 82 to the step 84 where the system call that is requested at the port is performed (i.e., is passed through to the remainder of the data storage device 22). Irrespective of any other configuration setting for the port 34, if the open override has been set, then any system calls presented at the port 34 are executed for so long as the open override remains in effect.

If it is determined at the test step 82 that the open override is not set, then control passes from the test step 82 to a test step 86 where it is determined if a close override has been set. Just as with the open override, the close override being set indicates that, irrespective of any other settings for the port 34, no system calls will be allowed at the port for so long as the close override remains in effect. Also, just as with the open override, the close override may be set for a predetermined amount of time, such as thirty minutes, and then reset thereafter, using the counter module 74.

If it is determined that the test step 86 that the close override has been set, then control passes from the test step 86 to a step 88 where the system call requested by a host system coupled to the port 34 is rejected. Rejecting the system call at the step 88 includes not performing the operation(s) dictated by the system call and returning a code to the requesting host system indicating that the system call has been rejected.

Following the test step 86 is a test step 90 which determines if configuration information exists for the port. In some embodiments, it may be possible to eliminate altogether the security configuration data element 66 (or alternatively, not create the security configuration data element 66 in the first place), in which case it is assumed that there is no security that thus all system calls may be requested at any of the ports 34–36. Thus, if it is determined at the test step 90 that there is no configuration information (i.e., no security configuration data element 66), then control passes from the test step 90 to the step 84 where the system call is performed.

If it is determined at the test step 90 that there is configuration data (i.e., the security configuration data element 66 exists), then control passes from the test step 90 to a test step 92 where the configuration information is examined to determine if a system call may be requested through the port 34. This may be indicated in the security configuration data element 66 in any one of a variety of conventional manners, including having a Boolean variable (flag) for each port indicating whether system calls are permitted at each of the ports. If it is determined at the test step 92 that system calls are not allowed, then control passes from the step 92 to the step 88 where the requested system call is rejected, as discussed above. Alternatively, if it is determined at the test step 92 that system calls are allowed, then control passes from the test step 92 to the step 84 where the system call is performed.

Note that the technique described herein may be generalized so that operations are performed and resources are allocated/assigned based on the identity of the requester of the information (i.e., the identifier of the host system). Thus, the technique may be generalized as providing a mechanism where the identifier of a requester (or group of requesters) is provided with particular access type or permissions to perform specific operations to or with certain devices or certain pools of devices (e.g., collections of devices). Thus, rather than simply restricting system calls on a port by port basis, it may be sufficient to indicate that a particular host system (or group of host systems) is or is not allowed to make system calls at any of the ports (or pool of ports). In addition, such a generalized scheme may be used to selectively allocate access to memory locations (e.g., the pool of devices) based on the identifier of a host system or group of host systems.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of restricting access to a storage device, comprising:
   coupling each of a plurality of host systems to the storage device by one of a plurality of ports provided for the storage device; and
   selectively determining, for each of the ports, whether system calls are allowed, wherein, for the ports in which system calls are not allowed, a system call by the host systems coupled thereto causes the storage device to indicate that the system call was not performed.

2. A method, according to claim 1, further comprising:
   providing a mechanism that controls whether the ports can accept system calls.

3. A method, according to claim 2, wherein providing a mechanism includes providing an external control device coupled to the storage device.

4. A method, according to claim 3, wherein the external control device acts like a dumb terminal sending characters to and receiving characters from the storage device.

5. A method, according to claim 1, further comprising:
   providing an override mechanism that allows system calls on ports that otherwise do not allow system calls.

6. A method, according to claim 5, wherein the override mechanism also blocks system calls on ports that otherwise allow system calls.

7. A method, according to claim 6, further comprising:
   resetting the override mechanism after a predetermined amount of time has passed since the mechanism had been set.

8. A method, according to claim 7, wherein the predetermined amount of time is thirty minutes.

9. A method, according to claim 5, further comprising:
   providing an external control device that facilitates setting of the override mechanism.

10. A method, according to claim 9, wherein providing an external control device includes providing a dumb terminal that sends characters to and receives characters from the storage device.

11. An apparatus for restricting access to a storage device, comprising:
    means for coupling each of a plurality of host systems to the storage device by one of a plurality of ports provided for the storage device; and
    means for selectively determining, for each of the ports, whether system calls are allowed, wherein, for the ports in which system calls are not allowed, a system call by the host systems coupled thereto causes the storage device to indicate that the system call was not performed.

12. An apparatus, according to claim 11, further comprising:
    means for providing a mechanism that controls whether the ports can accept system calls.

13. An apparatus, according to claim 12, wherein means for providing a mechanism includes an external control device coupled to the storage device.

14. An apparatus, according to claim 13, wherein the external control device acts like a dumb terminal sending characters to and receiving characters from the storage device.

15. An apparatus, according to claim 11, further comprising:
    an override mechanism that allows system calls on ports that otherwise do not allow system calls.

16. An apparatus, according to claim 15, wherein the override mechanism also blocks system calls on ports that otherwise allow system calls.

17. An apparatus, according to claim 16, further comprising:
    means for resetting the override mechanism after a predetermined amount of time has passed since the mechanism had been set.

18. An apparatus, according to claim 17, wherein the predetermined amount of time is thirty minutes.

19. An apparatus, according to claim 15, further comprising:
    an external control device that facilitates setting of the override mechanism.

20. An apparatus, according to claim 19, wherein the external control device includes a dumb terminal that sends characters to and receives characters from the storage device.

21. A port of a storage device, comprising:
    means for receiving data provided to the storage device;

means for sending data from the storage device; and means for inhibiting system calls provided to the port, wherein the system calls include requests for administrative operations for the storage device that do not send or receive data.

22. Computer software for controlling a port on a storage device, comprising:

means for communicating with the storage device; and control means, coupled to the means for communicating, for providing commands to the storage device that cause the port to not accept system commands provided thereto, wherein the system commands include requests for administrative operations by the storage device.

23. A method of determining whether to perform a system command received at a port of a storage device, comprising:

determining if an open override is set;

determining if port control data exists;

determining if port control data indicates that system calls are allowed; and performing a system call in response to at least one of: port control data indicating that system calls are allowed, an open override being set, and port control data not existing.

24. A method, according to claim 23, further comprising:

determining if a close override is set; and rejecting a system call in response to at least one of: a close override being set and port control data indicating that system calls are not allowed.

* * * * *